United States Patent [19]

Hashish et al.

[11] Patent Number: 4,669,760
[45] Date of Patent: Jun. 2, 1987

[54] SWIVEL FITTING ARRANGEMENT FOR USE IN A PRESSURIZED FLUID LINE

[75] Inventors: Mohamed Hashish, Kent; John H. Olsen, Vashon, both of Wash.

[73] Assignee: Flow Industries, Inc., Kent, Wash.

[21] Appl. No.: 826,191

[22] Filed: Feb. 5, 1986

[51] Int. Cl.[4] .............................. F16L 27/00
[52] U.S. Cl. .................... 285/272; 285/281; 285/370; 285/369
[58] Field of Search ............... 285/281, 272, 397, 398, 285/370, 371, 369

[56] References Cited

U.S. PATENT DOCUMENTS

| | | | |
|---|---|---|---|
| 537,744 | 4/1895 | Blackburn | 285/281 X |
| 1,889,980 | 12/1932 | Farley. | |
| 1,930,833 | 10/1933 | Barrett | 285/281 |
| 1,951,460 | 3/1934 | Williams et al. | 285/167 |
| 2,416,657 | 2/1947 | Trevaskis | 285/84 |
| 2,421,974 | 6/1947 | Vandervoort | 285/97.3 |
| 2,819,935 | 1/1958 | Grad. | |
| 3,067,777 | 12/1962 | Briscoe. | |
| 3,211,471 | 10/1965 | Darlington | 285/41 |
| 3,462,174 | 8/1969 | Raley | 285/14 |
| 3,623,751 | 11/1971 | Hulbert | 285/281 X |
| 3,913,952 | 10/1975 | Matsui et al. | 285/281 |
| 3,957,294 | 5/1976 | Hoban et al. | 285/276 |
| 3,967,842 | 7/1976 | Kendrick | 285/276 |
| 3,997,198 | 12/1976 | Linder | 285/281 X |
| 4,451,364 | 5/1984 | Higgins et al. | 285/177 X |
| 4,500,119 | 2/1985 | Geberth | 285/281 X |

*Primary Examiner*—Richard J. Scanlan, Jr.
*Attorney, Agent, or Firm*—Flehr, Hohbach, Test, Albritton & Herbert

[57] ABSTRACT

A swivel fitting arrangement for use in a pressurized fluid line, especially a high pressure, high flow rate line, is disclosed herein and utilizes first and second adjacent sections of the line in coaxial and unconnected relationship to one another so as to define an axial joint between the two sections and such that the first section is able to rotate aboout its axis relative to the second section. The arrangement also includes means for supporting the two line sections in their coaxial and unconnected relationship with one another and a tubular sealing member disposed coaxially within the line and across the axial joint between and directly against the adjacent sections and joint for internally sealing the joint while allowing fluid within the line to pass from one of the sections to the other.

17 Claims, 13 Drawing Figures

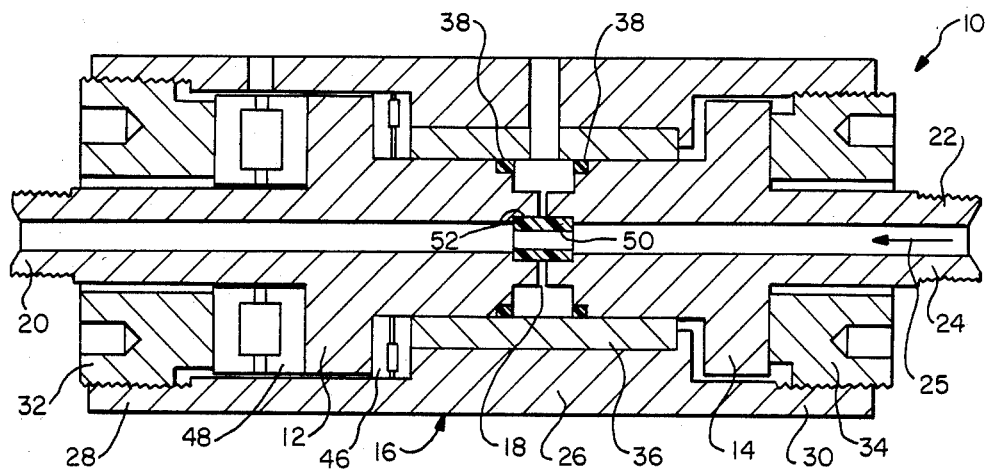
FIG.-1
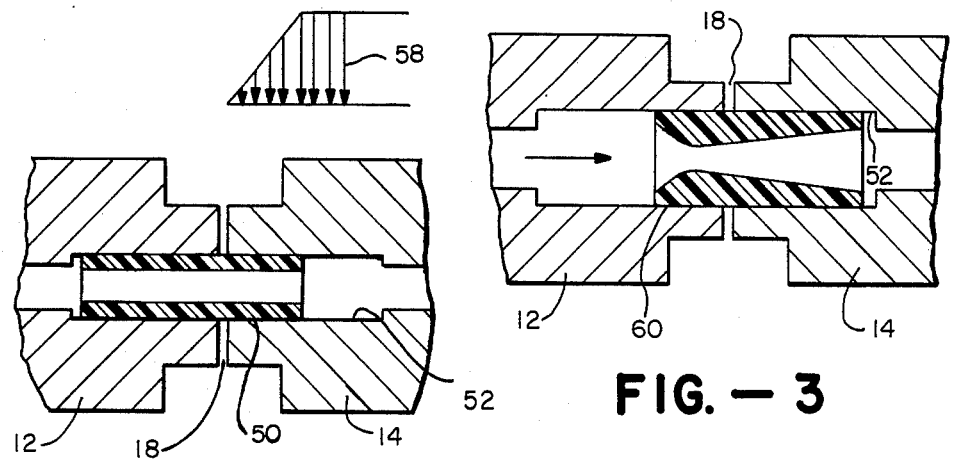
FIG.-2
FIG.-3
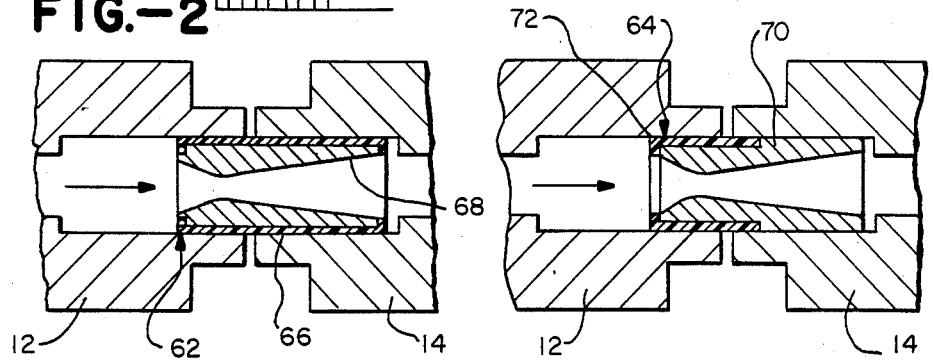
FIG.-4
FIG.-5

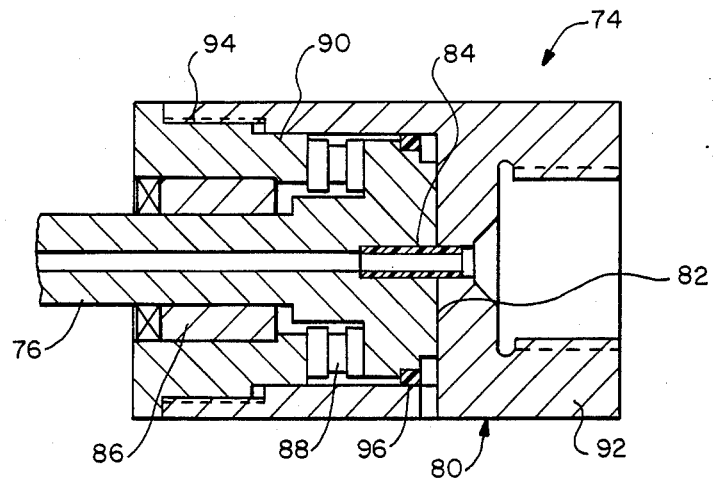
FIG.—6
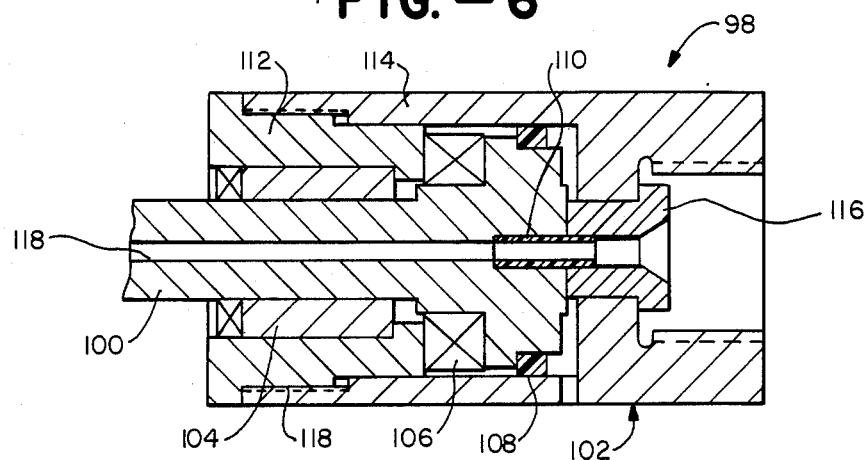
FIG.—7
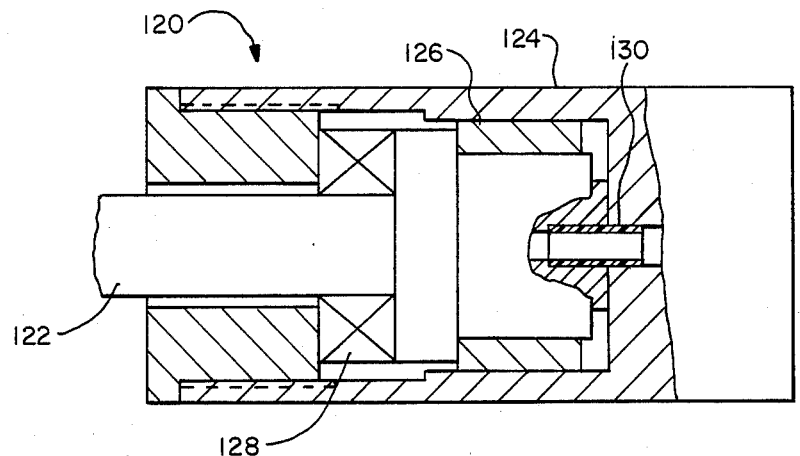
FIG.—8

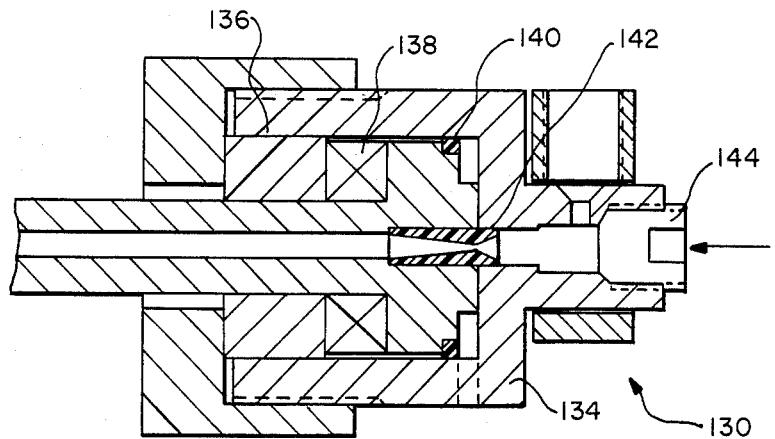
FIG. — 9
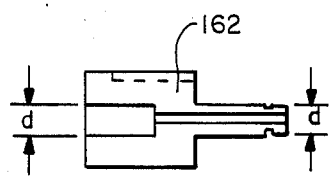
FIG. — 11A
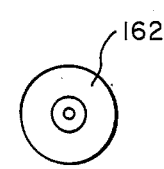
FIG. — 11B
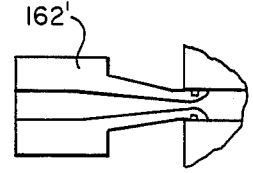
FIG. — 12
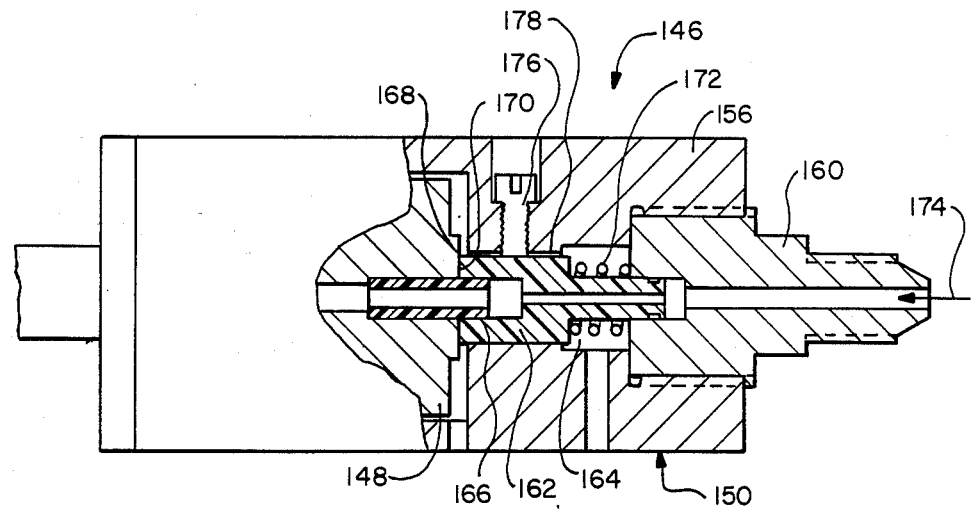
FIG. — 10

SWIVEL FITTING ARRANGEMENT FOR USE IN A PRESSURIZED FLUID LINE

The present invention relates generally to a swivel fitting arrangement for use in a pressurized fluid line and more particularly to an arrangement which is especially suitable for use in a high pressure (over 10,000 psi), high flow rate fluid line.

In order to allow one section of a pressurized fluid carrying line to pivot or swivel about its axis relative to a coaxial section of the line, it is necessary to provide a joint between the two and some sort of means to seal that joint. One typical prior art way of accomplishing this in high pressure, high flow rate applications is to utilize a large diameter shaft containing the joint and a sealing member disposed around the outside diameter of the shaft over the joint. However, it has been found that this type of approach results in high relative surface speed between the one section of the shaft and the sealing member which, in turn, tends to result in the generation of heat which exceeds the thermal capability of the seal, thereby causing the latter to fail. In addition, this type of configuration requires a relatively high driving torque to swivel one shaft section relative to the other, a large housing to support the high internal pressure, and a large bearing to support the high thrust on the shaft (if only one seal is to be used rather than two for a balanced thrust swivel).

A way to reduce the heat and high torque problems associated with the approach described immediately above and also to significantly reduce the overall size of the swivel is to locate the seal within the fluid line itself, as illustrated in U.S. Pat. No. 2,421,974 (Vandervoort). As seen, these two sections of a fluid carrying line are positioned in coaxial relationship to one another so as to define an axial joint between the two and a combination packing gasket-metal ring is disposed within the line and across the joint. However, note specifically that the metal ring itself extends across the joint between the latter and the packing gasket, as best illustrated in FIG. 2 in the patent. The sealing action will require that this metal ring be of precise dimensions especially on its outer diameter. The annular gap between this ring and the bores of the mating joint should be very small so that seal extrusion does not occur. As a result, the overall swivel fitting is only capable of operating at relatively low line pressures. More specifically, if the internal pressure within the Vandervoort swivel fitting becomes sufficiently large to cause the metal ring to deform outward, it will extrude into the joint between the two line sections and contacts the bore walls of the two mating sections causing very high friction and thereby significantly hinder the swivel action of the fitting and possibly prevent the fitting from swivelling altogether.

In view of the foregoing, it is one object of the present invention to provide a swivel fitting arrangement which does not have the heat and torque drawbacks of an arrangement in which the seal is externally mounted, as described above, and yet an arrangement which is especially suitable for use in high pressure, high flow rate applications.

A more particular object of the present invention is to provide a swivel fitting arrangement which utilizes an internally mounted sealing member across its joint and specifically an arrangement which will swivel in the intended manner even if the seal extrudes into the joint as a result of relatively high internal pressures.

Another particular object of the present invention is to provide a swivel fitting arrangement of the last mentioned type in which concentricity of the sections making up the arrangement is maximized and run out between the two sections is minimized in an uncomplicated and reliable way.

Still another particular object of the present invention is to provide a swivel fitting arrangement utilizing an in line sealing member disposed within the sections making up the fitting in a way which establishes whether the sealing member rotates or does not rotate, whichever is desired, without having to bond the sealing member to the rotating or non-rotating section.

Yet another particular object of the present invention is to provide a swivel fitting arrangement having an in line sealing member which is configured to minimize the possibility of extrusion of the member into the arrangement's joint as a result of high line pressures.

Still another object of the present invention is to provide the last-mentioned arrangement in which the sealing member is configured in axial cross-section so as to minimize the in-line pressure loss across the arrangement's joint as a result of its presence in the line.

A further particular object of the present invention is to provide a swivel fitting arrangement which includes an in-line sealing member along with an array of bearings and which is configured so that the sealing member can be easily replaced without having to disturb the bearings.

Still a further object of the present invention is to provide a swivel fitting arrangement including an in-line sealing member which is configured so as to allow the sealing member to be readily inserted into its operating position within the arrangement and also so as to more efficiently cool the sealing member by a means of the fluid passing through the arrangement.

Another particular object of the present invention is to provide a swivel fitting arrangement which includes an in line sealing member across its joint and which is configured so as to eliminate any axial gap defined by the joint.

As will be described in more detail hereinafter, the swivel fitting arrangement disclosed herein is one which utilizes first and second adjacent sections of a pressurized fluid line in coaxial and unconnected relationship to one another so as to define an axial joint between the two sections and such that the first section is able to rotate about its axis relative to the second section. The arrangement also includes means for supporting the first and second line sections in their coaxial and unconnected relationship and a tubular sealing member disposed coaxially within the fluid line and across the axial joint between the adjacent sections for internally sealing the joint while allowing fluid within the line to pass from one of the sections to the other.

In accordance with one feature of the present invention, the tubular sealing member is integrally formed with a sealing material which displays both sealing and bearing (low friction) characteristics, for example TEFLON ®. Thus, the sealing member which is disposed in direct contact with the joint serves as both a seal and relatively low friction bearing surface. Moreover, if the member is caused to deform radially outwardly by internal pressure within the line, and thereby extrude into the joint between the line sections, it will extrude into the joint without adversely affecting the seal across the joint or the swivel action between the adjacent sections.

In accordance with another feature of the present invention, the axial cross-section of the sealing member is greater along a segment thereof adjacent the joint then on either side of that segment, whereby to reinforce the sealing member against radially outward extrusion into the axial joint due to internal line pressure. The axial cross-section of the sealing member in this embodiment preferably defines a venturi across the joint in the direction of fluid flow through the line, whereby to minimize any drop in pressure across the joint.

In accordance with still another feature of the present invention, the sealing member extends further into the first line section then into the second line section so that it will rotate about its own axis with the rotation of the first line section without having to be bonded to the first section. On the other hand, if desired, the sealing member could be disposed further into the second line section then the first line section so as to cause it not to rotate with the rotation of the first line section, again without having to bond the sealing member in place.

In accordance with still a further feature of the present invention, the first and second sections making up the overall fitting arrangement are supported in their coaxial, unconnected positional relationship to one another by means of a single radial bearing disposed concentrically around the outside of these sections and over the joint between the two. This helps to maximize concentricity between the sections and minimize run out.

In accordance with still a further feature of the present invention, one of the line sections is divided into at least two sub-sections, one of which does not engage any bearings forming part of the overall arrangement. That particular sub-section is one which can be readily disengaged from the other, providing access to and allowing removal of the sealing member from its operating position. In that way, the sealing member can be replaced without disturbing the bearing system within the overall fitting arrangement.

Other objects and features of the present invention will become apparent hereinafter from the following detailed description in conjunction with the drawings wherein:

FIG. 1 is an axial sectional view of a swivel fitting arrangement which includes an in-line sealing member and which is designed in accordance with one embodiment of the present invention;

FIG. 2 diagrammatically illustrates the pressure distribution across an in-line sealing member during both leakage and non-leakage conditions;

FIGS. 3, 4 and 5 are diagrammatic illustrations of in-line sealing members designed in accordance with three different embodiments of the present invention;

FIGS. 6, 7, 8 and 9 diagrammatically illustrate in axial cross-section a number of swivel fit arrangements designed in accordance with other embodiments of the present invention;

FIG. 10 is a diagrammatic illustration, in axial cross-section, of a swivel fitting arrangement which includes an in-line sealing member and a cartridge designed in accordance with the present invention to eliminate any gap in the joint defined by the overall arrangement;

FIG. 11A is a side elevational view of a cartridge forming part of the arrangement of FIG. 10, which cartridge is designed to be hydrostatically balanced;

FIG. 11B is an end view of the cartridge illustrated in FIG. 11A; and

FIG. 12 is a side elevational view of a modified cartridge for use in the arrangement of FIG. 10.

Attention is immediately directed to FIG. 1 which illustrates a swivel fitting arrangement designed in accordance with the present invention and generally indicated by the reference number 10. This overall arrangement, which is especially suitable for high pressure applications, includes first and second adjacent sections 12 and 14 which when assembled into their operating positions form part of an overall pressurized fluid line (not shown). A support assembly 16 to be discussed below forms part of the overall arrangement for supporting sections 12 and 14 in coaxial and unconnected relationship to one another so as to define an axial joint 18 between the two sections and such that at least one of the sections, for example section 12, is able to rotate about its axis relative to the other section, for example section 14. As illustrated in FIG. 1, the non-confronting ends 20 and 22 of line sections 12 and 14 are externally threaded so that they can be thread connected into the overall line by means of cooperating internally threaded end sections of the line (not shown). In that way, fluid under pressure can flow from one section to and through the other, as indicated for example by means of arrow 25.

In the particular embodiment illustrated in FIG. 1, support assembly 16 is designed to support the two line sections 12 and 14 such that only section 12 rotates relative to section 14. While the overall fitting arrangement will be described accordingly, it is to be understood that the support assembly could be configured so that each rotates relative to the other. With this in mind, the support assembly as shown including a main coupling 26 internally threaded at opposite ends 28 and 30 so as to receive externally threaded end plugs 32 and 34, respectively. The coupling and end plugs are positioned concentrically around line sections 12 and 14 and joint 18, as shown. In accordance with one aspect of the present invention, a single, cylindrically shaped radial bearing 36 is disposed around the outside of and directly against adjacent segments of line sections 12 and 14 and across axial joint 18 in order to support line section 12 for rotation relative to section 14. Because of its position across both line sections, radial bearing 36 aids in maximizing the concentricity of the two line sections and minimizes run out as line section 12 rotates about its axis relative to section 14.

In addition to the components thus far described, overall support assembly 16 includes a pair of axially spaced low pressure seal rings 38 on opposite sides of joint 18 between line sections 12 and 14 and radial bearing 36. The purpose of the low pressure seal rings 38 is to keep the bearing surface free from foreign materials. Also, preload and thrust bearings 46 and 48, respectively, are provided in the positions shown and along with radial bearing 36 provide an overall bearing system for supporting line section 12 for rotation. Inasmuch as line section 14 is not designed to rotate, similar preload and thrust bearings are not provided for that purpose. However, it is to be understood that they could be so provided in order to allow line section 14 to also rotate.

In addition to the components thus far described, overall arrangement 10 includes a sealing member 50. The particular sealing member illustrated in FIG. 1 is integrally formed of a material which is capable of not only providing a seal across joint 18 but also one which is capable of serving as a relatively low friction bearing surface between the seal and one of the line sections 12 or 14 depending on which rotates and whether the seal rotates or is fixed. One particular material which meets both of the requirements just recited is TEFLON ®, as indicated heretofore, although there are other materials which would be suitable including but not limited to nylon or delrin.

The purpose of sealing member 50 is to seal joint 18 while at the same time allowing one of the line sections to rotate relative to the other. At the same time, it is desirable to minimize the pressure drop across the joint. To this end, the sealing member is preferably disposed within an enlarged axial section 52 of the overall fluid carrying passage 54 defined by line sections 12 and 14 such that the inner diameter of sealing member 50 is at least approximately equal to the diameter of passage 54.

A particular feature of sealing member 50 worth noting is that it is preferably constructed of a material, for example, one of the materials recited above, which will allow it to radially outwardly deform and thus extrude into joint 18 rather than crack in response to relatively large line pressures. Should the pressure within the sealing member increase to a level which does cause it to deform and thereby extrude partially into joint 18, the swiveling capability of the fitting arrangement will not be adversely affected to a significant degree. This is because the extruded segment of the sealing member nevertheless serves as a bearing surface, as contrasted with, for example, the metal ring in the previously described Vandervoort U.S. Pat. No. 2,421,974.

This deforming capability of sealing member 50 also aids in eliminating leaks which occur along the outer surface of the sealing member between passage section 52 and gap 18. This is best illustrated by the pressure patterns within the interface between the seal 50 and line sections 12 and 14 generally indicated at 56 and 58 in FIG. 2. The pressure pattern 56 represents the pressure across the seal interface when no leaks are present. The pattern 58 corresponds to the pressure across the seal interface when a leak occurs. As a result of either pattern, the bore pressure within sealing member 50 will tend to deform the seal material radially outward so as to fill the void permitting any leak and thereby close the latter.

Another aspect of sealing member 50 worth noting resides in the way in which it may be positioned within passage section 52 so as to control whether or not it rotates. This is best illustrated in FIG. 2 where the sealing member is shown extending further into line section 12 than into line section 14. In other words, the sealing member extends further to the left of the gap 18 as viewed in FIG. 2 than to the right of the gap. As a result of this positional relationship between the sealing member and the two line sections, the sealing member will tend to rotate with line section 12 rather than remaining stationary with line section 14, without having to bond the sealing member to line section 12. This presupposes that the sealing member fits approximately equally tight within both of the line sections. If the sealing member were positioned further into line section 14, than into line section 12, the sealing member would remain stationary with section 14 as line section 12 rotates. In contrast to both of these extremes, if the sealing member were to extend into the two line sections equally, it could not be predicted whether it would rotate or not unless the sealing member were bonded to one or the other of the line sections. In this regard, it is not desirable to bond the sealing member in place since that makes it more difficult to remove the sealing member when the latter has to be replaced. At the same time, it is important to be able to predict whether or not the sealing member is to rotate in order to appropriately select the material it rotates against (or which rotates against it) so as to minimize friction between the two. For example, if it is known that the sealing member is going to rotate relative to line section 14, the material making up this latter line section can be appropriately selected to provide a suitable bearing surface against the sealing member.

As indicated above, it is possible for the sealing member 50 to extrude into axial joint 18 as a result of relatively high line pressures. One way to reduce this from occurring is to design the cross-sectional configuration of the sealing member so that it is thicker at the joint than on either side thereof. In a preferred embodiment, this is accomplished by designing the sealing member so that it defines a venturi in the direction of fluid flow through passageway 54, as illustrated by the sealing member 60 illustrated in FIG. 3. This provides the additional advantage of reducing the pressure drop across joint 18 by providing pressure recovery downstream. Similar sealing member configurations 62 and 64 are illustrated in FIGS. 4 and 5, respectively. The configuration 62 includes an outermost cylindrical sealing member 66 constructed of suitable sealing and bearing material, for example the same material forming member 50. However, the configuration also includes an inner member 68 which is harder or more rigid than member 66 and which does not have to provide either a sealing or bearing capability. Rather, member 68 serves to prevent internal line pressures from causing the sealing member 66 to extrude into joint 18. Member 68 may also have a venturi type of axial cross-section to minimize the pressure drop across joint 18. Configuration 64 is similar to configuration 62 to the extent that it includes a sealing member 70 and a reinforcement member 72 having a venturi type axial cross-section. However, member 72 extends axially beyond the sealing member 70 on one side thereof. Since the overall configuration 64 rotates with line section 12, member 72 does not have to have bearing capabilities.

An additional advantage to composing the seal insert as shown in FIGS. 4 and 5 is to be able to reuse sections 68 or 72 in FIGS. 4 and 5 respectively. Only the sealing elements 66 or 72 which are in a simple cylindrical form need to be replaced after their useful lifetime.

From the foregoing, it should be noted that the sealing member 60 and the configurations 62 and 64 have square ends as opposed to the angle ends of sealing member 50. In this regard, it is to be understood that the present invention is not limited to either square ends or angled ends and that any of the sealing members described thus far or to be described hereinafter may include either square ends or angled ends or one of each. Also, while the sealing members forming part of all the fitting arrangements to be described are disposed further into one line section than the other, it is to be understood that the present invention is not limited to such configurations. In other words, in the embodiments to be described, the sealing members could be disposed equally on either side of their respective joints. Moreover, while each of the embodiments to be described includes a sealing member having a particular axial cross-section, it could have other axial cross-sections including specifically any one of the cross-sections illustrated in FIGS. 2–5.

With the discussion immediately above in mind, attention is now directed to FIG. 6 which illustrates a swivel fitting arrangement 74 designed in accordance with another embodiment of the present invention. Arrangement 74 includes coaxial and unconnected line sections 76 and 80 which together define a joint 82 and an in-line sealing member 84 extending across the joint. These line sections and the sealing member as a whole function in the same manner as previously described sections 12 and 14 and sealing member 50 with section 76 and the sealing member 84 rotating relative to section 80. To this end, the arrangement includes radial and thrust bearing 86 and 88, respectively, disposed between the two line sections, as illustrated in FIG. 6.

Overall arrangement 74 differs from previously described arrangement 10 in that line section 80 is configured so that sealing member 84 can be easily accessed and removed from its operating position without disrupting the bearings 86 and 88. To this end, line section 80 is comprised of two sub-sections 90 and 92 which are disengageably connectable to one another by means of axial bolts or threads 94. Sub-section 90 is disposed concentrically around radial bearing 86 and axially against bearings 88 while sub-section 92 does not engage any bearings at all. At the same time, the sub-section 92 can be disengageably connected from sub-section 90 so as to expose sealing member 84 to the ambient surroundings without affecting bearings 86 and 88. This allows the sealing member 84 to be readily accessed and replaced when and if necessary without involving the bearings at all. Low pressure sealing rings are preferably provided between line section 76 and sub-section 92 of line section 80, as indicated at 96 in FIG. 6 and between line member 76 and subsection 90 of line section 80 and indicated at 96a in FIG. 6.

Referring to FIG. 7, there is illustrated still another swivel fitting arrangement 98 which is slightly different than the arrangement 74 described immediately above. The arrangement 98 includes a line section 100 intended to rotate, a coaxial unconnected line section 102, an assembly of bearings 104 and 106, a low pressure sealing ring 108 and in-line sealing member 110. The line section 102 is made up of three sub-sections, a first sub-section 112 designed to engage the bearings 104, 106 and two sub-sections 114 and 116 which do not engage the bearings. Sub-section 114 is disengageably connected to sub-section 112 by means of axial bolts or threads generally indicated at 118. The sub-section 116 which is in the form of a cartridge is disposed within a cooperating opening in sub-section 114 for receiving an end segment of sealing member 110, as illustrated in FIG. 7. With the sealing member positioned in the manner shown, that is, further into line section 100 than into cartridge 116, the sealing member is intended to rotate with line section 100. If the passageway 118 in line section 100 has minimum or no run out, then the cartridge 116 can be configured to float in order to achieve maximum concentricity. Otherwise, the cartridge is fixedly held within sub-section 114. In either case, the cartridge 116 can be readily removed (or replaced) to access and replace sealing member 110 without involving bearings 104 and 106. Another advantage of using the cartridge 116 is that it can easily be made of a wear resistant material such as tool steel, tungsten or titanium carbide due to its simple shape.

FIG. 8 illustrates a swivel arrangement 120 which is similar to arrangement 74 in a number of respects. More specifically, arrangement 120 includes a line section 122 corresponding to line section 76, a two-piece line section 124 corresponding to two piece line section 80, radial and thrust bearings 126 and 128, respectively, and a sealing member 130. However, the radial bearing in arrangement 120 is substantially closer to its sealing member 130. By providing the radial bearing closer to its sealing member, run out is reduced.

In arrangement 120, the radial bearing 126 is mounted in section 124.

Referring to FIG. 9, a swivel arrangement 130 similar in many respects to arrangement 98 is illustrated. Like arrangement 98, arrangement 130 includes a rotating line section 132 corresponding to line section 100 of arrangement 98, a multi-piece line section 134 corresponding to line section 102, radial and thrust bearings 136 and 138, respectively, a low pressure sealing ring 140 and a sealing member 142. In addition, the arrangement 130 includes a plug 144 which forms part of multi-piece line section 134 and which is disengageably connected from the rest of that line section. By removing the plug, the sealing member 142 can be accessed and readily replaced without involving the bearings or any of the tubing connected to the swivel 130.

In all of the arrangements thus far described, none included active means to eliminate any gap at its axial joint, although all of the arrangements described previously show such a configuration, except for arrangement 10 which illustrates a gap across its point 18. FIG. 10 illustrates an arrangement 146 which does include positive means for ensuring no gap at its axial joint, as will be described immediately below.

Turning to FIG. 10, the arrangement 146 is shown including a rotating line section 148 and an unconnected, coaxial multi-piece line section 150. This latter line section includes a first sub-section 156 which, while not shown, engages the necessary bearings forming part of the fitting arrangement, a second sub-section 160 and a third one 162. The sub-section 160 functions as an end plug and supports one end of sub-section 162 for axial slidable movement to a limited extent within a cooperating cavity 164.

The other end of sub-section 162 serves to contain one end segment of a sealing member 166 which forms part of the overall arrangement. The end surface of sub-section 162 which is generally indicated in 168 is in confronting relationship with a corresponding end surface 170 of line section 148. The two confronting surfaces 168, 170 together define the arrangement's axial joint. As well seen below, the sub-section 162 which serves as a cartridge is axially biased in the direction of surface 170 so as to eliminate any gap within the axial joint.

Still referring to FIG. 10, the sub-section cartridge 162 is shown axially biased to the left, as viewed in the figure, by means of a spring member 172 which is disposed concentrically around a reduced segment of the cartridge within cavity 164 and between the larger segment of the cartridge and the end face of plug 160. At the same time, the cartridge itself, due to its structural configuration, is hydrostatically balanced for the reasons to be discussed below.

In order to explain how the cartridge 162 is hydrostatically balanced, reference is made to FIGS. 11A and 11B. As seen in these figures, the righthand end of the cartridge has an outer diameter d while the lefthand end has the same inner diameter. With this in mind and noting that flow within the fitting arrangement is from right to left in FIG. 10 as indicated by arrow 174, it can be seen that the axial pressure forces acting on opposite ends of the cartridge are equal and opposite, thereby making the cartridge hydrostatically balanced. Still referring to FIG. 10, note that the cartridge is prevented from rotating about its axis by means of a set screw 176 disposed within a cooperating opening end sub-section 156 and engageable in an axial extending spline 178 in cartridge 162.

By making cartridge 162 hydrostatically balanced, the spring force exerted by spring member 172 will guarantee a light contact between the confronting surfaces 168, 170 regardless of the line pressure within the overall fitting arrangement. This spring force will compensate for axial deflections and gap increase due to pressurization. The spring cavity 164 can be precharged with adequate gas pressure to maintain higher contact force between the mating surfaces, if desired. Also, the cartridge can be configured to define an internal venturi to minimize pressure loss, as indicated by the modified cartridge 162' illustrated in FIG. 12.

What is claimed is:

1. A swivel fitting arrangement for use in a pressurized fluid line, said arrangement comprising:
    (a) first and second adjacent sections of said line in coaxial and unconnected relationship to one another so as to define an axial joint disposed axially between adjacent confronting ends of the two sections and extending radially between the inner and outer surfaces of said line sections such that said first section is able to rotate about its axis relative to said second section;
    (b) means for supporting said first and second line sections in said coaxial and unconnected relationship so as to define said axial joint and such that said first section is rotatable about its own axis relative to said second section; and
    (c) a tubular sealing member which is integrally formed of a material having sealing and bearing characteristics and which is disposed coaxially within said line and across said axial joint such that opposite end segments of said sealing member engage directly against internal surfaces of said adjacent line sections, respectivley, for internally sealing said joint while allowing fluid within the line to pass from one of said sections to the other section and while allowing said first line section to rotate.

2. An arrangement according to claim 1 wherein said sealing member extends further into said first line section than into said second line section so as to cause the sealing member to rotate about its own axis with the rotation of said first line section without having to bond the sealing member to said first section.

3. An arrangement according to claim 2 wherein said sealing member has an axial cross-section which is thicker along a specific segment thereof directly adjacent said joint than along segments of the sealing member located on either side of the specific segment and spaced further from said joint, whereby to reinforce the sealing member against radially outward extrusion into said axial joint due to internal pressure within the line.

4. An arrangement according to claim 2 wherein said sealing member defines a venturi across said joint in the direction of fluid flow through said line.

5. An arrangement according to claim 1 wherein said sealing material is TEFLON ®.

6. An arrangement according to claim 1 including means more rigid than said sealing material located radially within and directly against said sealing member for preventing said member from extruding into said axial joint due to internal pressures within said line.

7. An arrangement according to claim 6 wherein said more rigid means has an axial cross-section which defines a venturi across said joint in the direction of fluid flow through said line.

8. An arrangement according to claim 1 wherein said supporting means includes a single, tubular radial bearing disposed concentrically around the outside of adjacent segments of said first and second line sections and said joint.

9. An arrangement according to claim 1 wherein said supporting means includes bearing means disposed between and in direct contact with cooperating surfaces of said first and second line sections for allowing said first line section to rotate about its own axis relative to said second line section and wherein said second line section includes a first subsection providing the cooperating surface or surfaces of said first section and a second subsection disengageably connected with said first subsection, said subsections being configured such that the disengagement of said second subsection from said first subsection provides access to and allows removal of said sealing member from the arrangement for replacement thereof without having to disturb said bearing means.

10. An arrangement according to claim 9 whereby said second subsection consists of two disengageably connectable segments, only one of which is in direct contact with said sealing member whereby disengagement of said one segment of said second subsection from the other segment thereof provides access to and allows removal of said sealing member from the arrangement.

11. An arrangement according to claim 10 wherein said sealing member is disposed within said line for rotation with said first line section and wherein said one segment is connected with said other segment such that said sealing member rotates with said first line section relative to said one segment while said one segment is free to float radially to a limited extent relative to said other segment.

12. An arrangement according to claim 1 wherein said supporting means includes both radial and axial bearing means disposed between and in direct contact with cooperating surfaces of said first and second line sections for allowing said first line section to rotate about its own axis relative to said second line section, said radial bearing means being positioned axially closer to said joint than said axial bearing means.

13. An arrangement according to claim 1 wherein one of said line section includes a first subsection, a second subsection located radially within and movable axially relative to said first subsection, and spring means biasing said second subsection in the direction of said first line section, said second subsection being disposed in direct contact with said sealing member and having a radially extending circumferential surface in confronting relationship with a cooperating surface of said first line section such that the cooperating surfaces together define said joint, said spring means serving to bias the cooperating surface of said second subsection against the cooperating surface of said first line section whereby to eliminate any gap between the two surfaces.

14. An arrangement according to claim 13 wherein said second subsection is configured to be hydrostatically balanced as a result of the internal pressure within said line.

15. A swivel fitting arrangement for use in a pressurized fluid line, said arrangement comprising:
   (a) first and second adjacent sections of said line in coaxial and unconnected relationship to one another so as to define an axial joint disposed axially between adjacent confronting ends of the two sections and extending radially between the inner and outer surfaces of said line sections such that said first section is able to rotate about its axis relative to said second section;
   (b) means for supporting said first and second line sections in said coaxial and unconnected relationship so as to define said axial joint and such that said first section is rotatable about its own axis relative to said second section; and
   (c) a tubular sealing member which is integrally formed of a material having sealing and bearing characteristics and which is disposed coaxially within said line and across said axial joint such that opposite end segments of said sealing member engage directly against internal surfaces of adjacent line sections, respectively, for internally sealing said joint while allowing fluid within the line to pass from one of said sections to the other section, said sealing member extending further into said first line section than said second section so as to cause the sealing member to rotate about its own axis with the rotation of said first line section without having to bond the member to said first section.

16. A swivel fitting arrangement for use in a pressurized fluid line, said arrangement comprising:
   (a) first and second adjacent sections of said line in coaxial and unconnected relationship to one another so as to define an axial joint between the two sections and such that said first section is able to rotate about its axis relative to said second section;
   (b) means for supporting said first and second line sections in said coaxial and unconnected relationship so as to define said axial joint and such that said first section is rotatable about its own axis relative to said second section; and
   (c) a tubular sealing member disposed coaxially within said line and across said axial joint between said adjacent sections for internally sealing said joint while allowing fluid within the line to pass from one of said sections to the other section, said sealing member extending further into said second line section than said first section so as to cause the sealing member not to rotate about its own axis with the rotation of said first line section.

17. An arrangement according to claim 1, wherein said sealing member extends further into one of said line sections than the other.

* * * * *